June 16, 1925.

S. W. RAYMOND 1,542,094

TRACTOR CULTIVATOR

Filed Oct. 2, 1922

4 Sheets-Sheet 1

INVENTOR
Samuel W. Raymond
by

June 16, 1925.
S. W. RAYMOND
TRACTOR CULTIVATOR
Filed Oct. 2, 1922
1,542,094
4 Sheets-Sheet 3
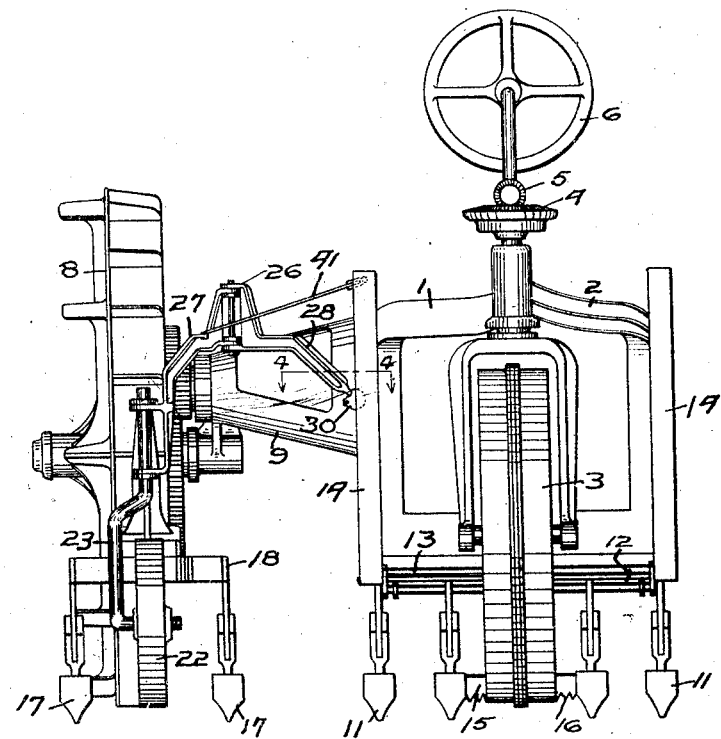
Fig.3.
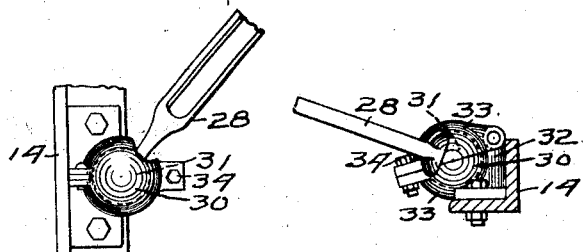
Fig.5.
Fig.4.
INVENTOR
Samuel W. Raymond
by
Owen, Owen & Crampton

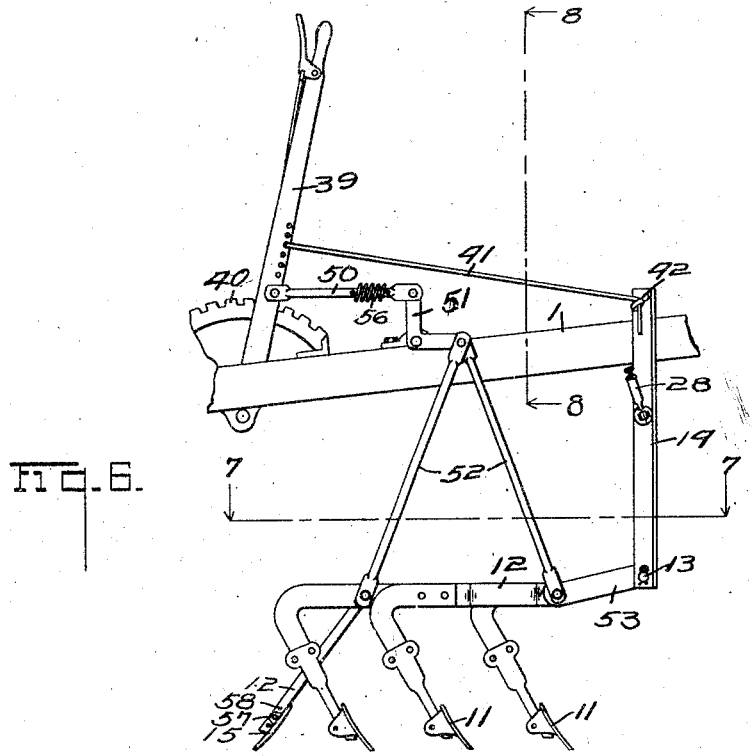
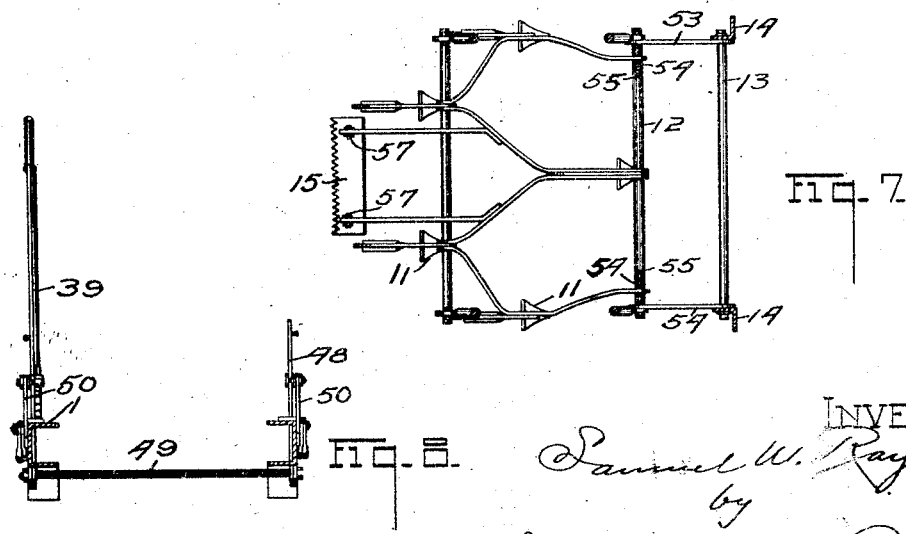

Patented June 16, 1925.

1,542,094

UNITED STATES PATENT OFFICE.

SAMUEL W. RAYMOND, OF ADRIAN, MICHIGAN.

TRACTOR CULTIVATOR.

Application filed October 2, 1922. Serial No. 591,686.

*To all whom it may concern:*

Be it known that I, SAMUEL W. RAYMOND, a citizen of the United States, and a resident of Adrian, in the county of Lenawee and State of Michigan, have made an invention appertaining to a Tractor Cultivator; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a cultivator structure that may be readily attached to tractors. It particularly has for its object to provide means for controlling the depth at which the cultivator plows will operate on the soil, and means for manipulating the cultivator structure or parts thereof to remove the cultivator plows from the ground. Moreover, means is provided for readily adjusting the position of the parts of the cultivator structure to the distance between the rows of vegetation to be cultivated. The invention has for its object other advantages and features which will appear in the following description and drawings.

The invention may be contained in structures which vary in their details. To illustrate a practical application of the invention I have selected a structure containing the invention and shall describe the structure thus selected hereinafter. The particular structure selected is illustrated in the accompanying drawings.

Figure 1:
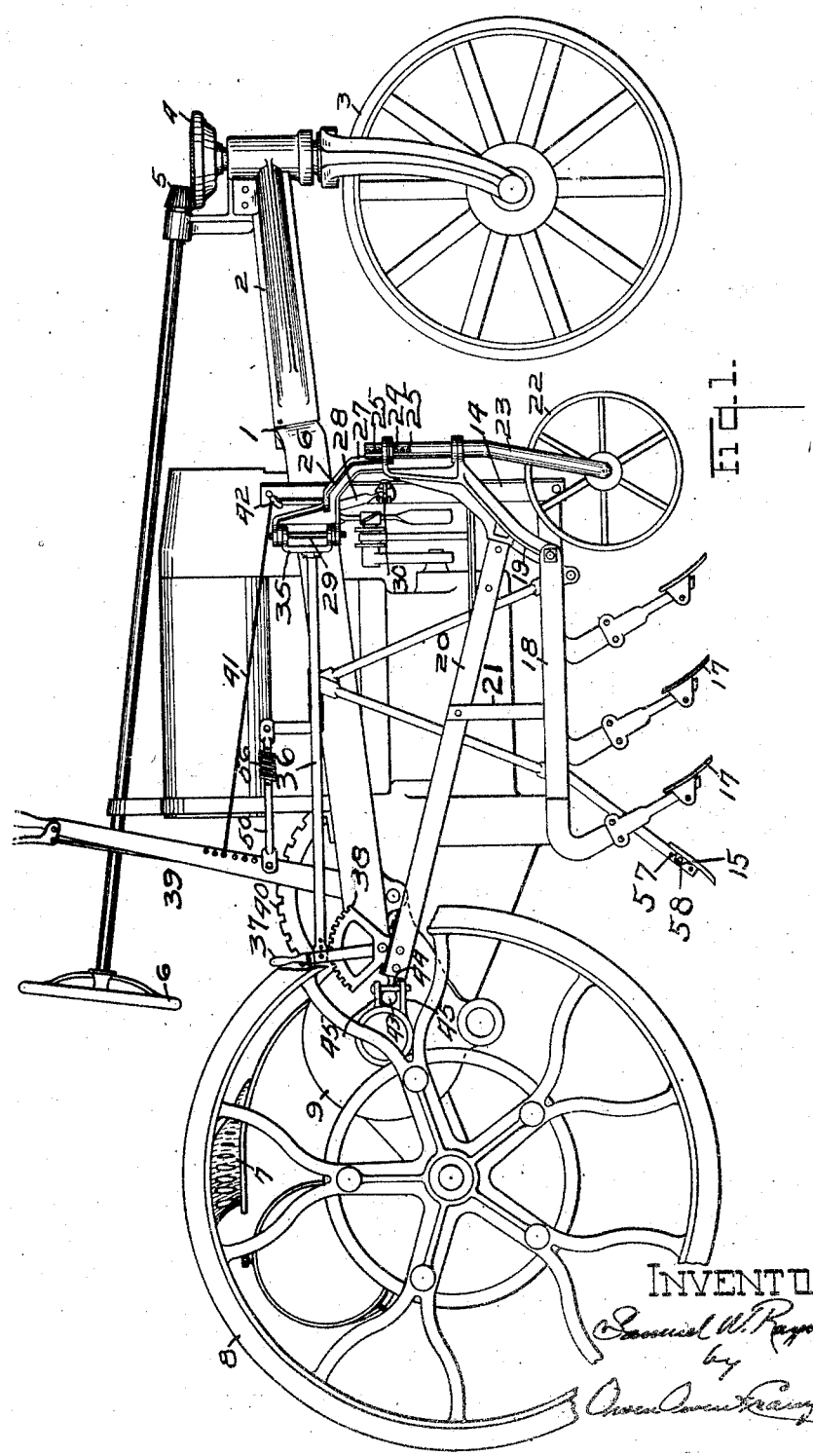
Figure 2:
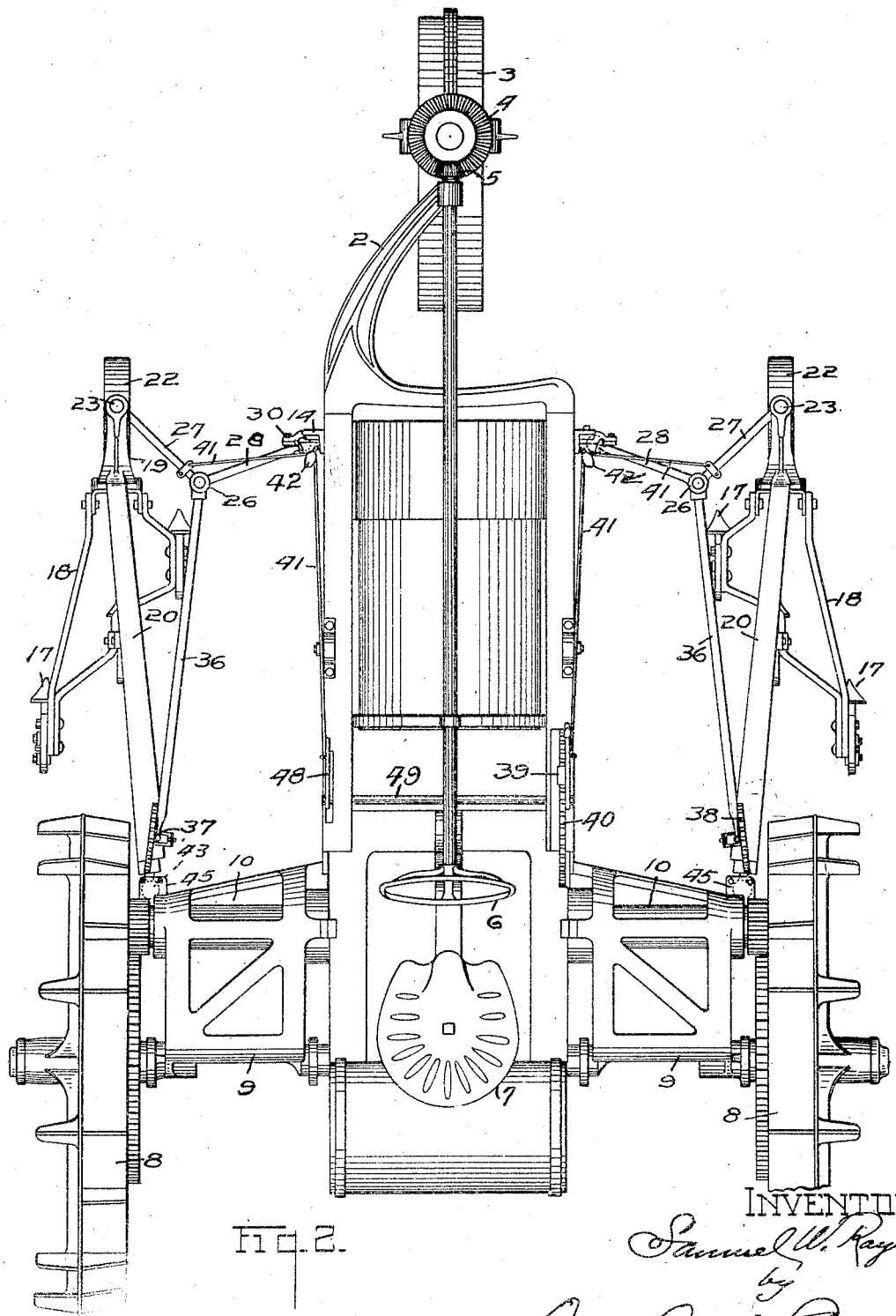

Figure 1 illustrates a side view of the cultivator. Fig. 2 illustrates a top view. Fig. 3 illustrates a front view of the cultivator. Figs. 4 and 5 illustrate the details of a ball and socket joint connecting parts of the structure. Fig. 6 illustrates a partly broken view of the tractor and a central cultivator frame. Fig. 7 is a sectional view taken on the line 7—7 indicated in Fig. 6. Fig. 8 is a sectional view taken on the line 8—8 indicated in Fig. 6.

In the drawings, 1 is the frame of the tractor. The frame 1 is provided with an arm 2 in which is supported a castor wheel 3. The castor wheel is operated by the bevelled gear wheels 4 and 5, the bevelled gear wheel 5 being connected to the steering wheel 6 which is suitably located with reference to the driver's seat 7. The bull wheels 8 of the tractor are supported on stub axles that are secured in castings 9 in which suitable extensions 10 for the jack shaft of the tractor are also supported. The jack shaft is divided and is independently and differentially driven in the manner well known in the art. Thus the tractor may be steered by clutching one of the parts of the jack shaft and allowing the engine to drive the tractor through the other part of the jack shaft, which will cause one of the bull wheels to be held stationary while the other is rotated. This will swing the tractor around the vertical axis in the bull wheel, that is held by the clutch, which extends through the hub of the wheel. The guiding means, being a castor wheel will follow the swing of the leading end of the tractor. This is particularly convenient in the turning at the ends of the rows of vegetation, and by proper manipulation as between the clutching means and the steering wheel, destruction of vegetation during the turning operations is easily avoided.

The cultivator structure is particularly adapted and may be used with great advantage in such a tractor. The cultivator is formed of three parts which enables the complete cultivation of two rows of vegetation at the same time. The parts between the rows are cultivated by the plows 11 that are secured to the frame 12. The frame 12 is connected by means of the cross rod 13 to the uprights 14 which are secured to the frame 1 of the tractor by suitable bolts. Their depth is regulated by the scuffer or drag 15. The scuffer or drag may be formed of a steel plate having a serrated edge 16 which extends across the major portion of the distance between the rows. The scuffer 16 being located behind the plows 11, operates to break up and pulverize the soil, particularly on the surface thereof, after it has been cultivated by the cultivator plows. The scuffer 15 is located at an angle, it being inclined upwards and towards the forward end of the tractor. It thus not only operates to break up the soil, but also to regulate the position of the frame 12 with reference to the surface of the soil. The forward end of the frame 12 is located in proximity to the castor wheel 3 and the scuffer is located in proximity to the line connecting the points of contact of the bull wheels with the soil, so that notwithstanding the grade changes of the soil over which the tractor passes, the depth of the cultivator plows will be maintained uniform, with the result that the ground will be uniformly cultivated, that is, cultivated to a uniform depth, by the cultivator plow 11.

The outer sides of each pair of rows of vegetation are cultivated by the cultivator plows 17 which are connected to the frames 18. The frames 18 are pivoted to the frames 19 and are supported by the said frames 19 and the push bars 20 to which the frames 18 are connected by the rods 21.

The frames 19 are supported by the castor wheels 22 pivotally mounted on the vertical bars 23. Each bar 23 extends through a bifurcated part of the frame 19 which forms bearings for the shank, or vertical bar 23, of the castor wheel 22. The relative position of the frame 19 to the bar 23 may be adjustably located by a pin 24 that may be inserted in any one of the holes 25 formed in the upper end of the bar 23.

The position of the bifurcated end of each frame 19 relative to the central longitudinal line or axis of the tractor frame is determined by the jointed frame or toggle 26 having the two parts 27 and 28. The part 27 is also provided with a bifurcated end that is located within the bifurcated end of the frame 19 through which the shank or vertical bar 23 of the castor wheel 22 also extends. The parts 27 and 28 have bifurcated ends that interfit. They are connected together by the pin or bolt 29. The remaining end of the part 28 is connected for universal movements by the ball and socket joint 30, the ball 31 being secured to the end of the part 28 and the socket 32 being secured to the bar 14. The socket 32 may be formed of two parts 33, one of which is secured to the bar 14 and the other pivotally connected therewith, suitable clamping bolts 34 being provided for securing the parts 33 together and enclosing the ball 31. At the joint of the toggle is located a yoke 35 which substantially fits the bifurcated end of the part 28. The yoke 35 is pivotally connected to the parts 27 and 28 by the pin 29. A rod 36 is connected to the yoke 35 and to a lever 37. The lever 37 is secured in position at any desired point along a locking sector 38 of the type well known in the art. Movement of the lever 37 operates to swing the part 28 forward or back, and the push rod 20 being connected to the tractor frame, secures through the frame 19, the outer bifurcated end of the part 27 from forward or backward movement, with the result that movement of the lever 37 causes a lateral movement of the frame 19, with the consequent lateral movement of the frame 18 and of the plows 17. Thus the distance of each frame 18 from the center line of the tractor may be readily adjusted by the operation of the lever 37.

If it is desired to prevent the plows from engaging the ground during movement of the tractor, either or both of the frames 18 may be raised by the lever 39 that moves over a locking sector 40. The lever 39 is connected by cables 41 that pass through the pulleys 42 to the toggles 26, and from the lever 39 in one case and the arm 48 in the other case. The arm 48 is connected to the lever 39 by the shaft 49. It may be connected to the part 27 near the toggle joint formed by the pin 29. When the lever 39 is moved in one direction the entire side harnesses, to which the cultivator plows 17 are connected, are lifted. The side harnesses may thus be lifted well above the vegetation. This is of particular advantage in turning at the end as the pairs of rows are completed. The axis of rotation of each side harness extends through the ball and socket joint 30 and the ball 43 that is connected to the end of the push rod 20. Each ball 43 is located between a pair of pins or bolts 44 and a pair of flanges 45 formed on the frame 1 of the tractor. This forms a universal connection between the end of the push rod 20 and the tractor frame to permit, not only lateral movements of the other end of the push rod 20, but also the swinging movement that is induced by the operations of the lever 39. The sector 38 and the lever 37, moreover, are connected to the end of the push rod 20 near the ball 43. Therefore the toggle is not materially affected when the side harness is raised.

The frames 19 and 26 form an arched jointed arm that extends to the leading end of each of the frames 18, and thus the cultivator may be used for cultivating corn after it has reached a considerable height in its growth.

If desired the central harness may also be raised by a suitable lever and a link or cable connection. In the form of the construction shown, the lever 39 and the arm 48 are connected by links 50 and spring 56 to the bell crank lever 51 that are pivotally mounted on the frame 1. The bell crank levers are connected to the central frame 12 by means of the links 52 that are connected to the front and back corners of the frame 12 whereby the frame 12 is lifted from the ground sufficiently to cause the cultivator plows 11 to clear the ground upon the operation of the lever 39. The frame 12 being connected to the cross bar 13 by means of the links 53 enables this lifting operation through the links 52.

The plows are adjusted laterally by the pins 54 and the holes 55. Also the greatest depth of the plows are adjusted by the pins 57 and the holes 58.

I claim:

1. In a tractor cultivator, a pair of side harnesses each comprising a frame, a toggle joint interconnecting the frame to the tractor, and a push rod connected to the tractor at a point at the rear of the frame and to the forward end of the frame for applying pressure at a point near the forward end of the frame for moving the frame with the tractor, means for limiting the movement of the toggle for determining the lateral position of the frame relative to the center line of the tractor.

2. In a tractor cultivator, a frame, cultivators connected to the frame, a castor wheel connected to the leading end of the frame, a push rod connected to the leading end of the frame for moving the frame with the tractor, a toggle joint connected to the end of the frame, and means for limiting the movement of the toggle joint for determining the position of the frame relative to the center line of the tractor.

3. In a tractor cultivator, a frame, cultivators connected to the frame, a castor wheel connected to the leading end of the frame, a push rod connected to the leading end of the frame for moving the frame with the tractor, and means for adjusting the position of the castor relative to the frame.

4. In a tractor cultivator, a frame, cultivators connected to the frame, a castor wheel connected to the leading end of the frame, a push rod connected to the leading end of the frame for moving the frame with the tractor, a toggle joint connected to the end of the frame, and means for limiting the movement of the toggle joint for determining the position of the frame relative to the center line of the tractor, and means for raising the frame from the ground.

5. In a tractor cultivator, a pair of side frames, cultivator plows connected to the side frames, toggle joints connecting the side frames with the tractor frame, means for raising the side frames from the ground.

6. In a tractor cultivator, a pair of side frames, cultivator plows connected to the side frames, toggle joints connecting the side frames with the tractor frame, castor wheels for supporting the frames, means for raising the frames and the castor wheels from the ground.

In testimony whereof I have hereunto signed my name to this specification.

SAMUEL W. RAYMOND.